United States Patent
Stenfort

(10) Patent No.: US 6,591,350 B1
(45) Date of Patent: Jul. 8, 2003

(54) SYSTEM AND METHOD FOR DYNAMICALLY CONTROLLING MEMORY ACCESS PRIORITIZATION

(75) Inventor: Ross John Stenfort, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/453,988

(22) Filed: Dec. 2, 1999

(51) Int. Cl.[7] .............................................. G06F 12/00
(52) U.S. Cl. .......................... 711/158; 711/112; 710/41
(58) Field of Search ................................. 711/112, 151, 711/158; 710/6, 48, 40, 41

(56) References Cited

U.S. PATENT DOCUMENTS

| | | | | |
|---|---|---|---|---|
| 4,819,203 A | * | 4/1989 | Shiroyanagi et al. ....... | 711/113 |
| 5,524,235 A | * | 6/1996 | Larson et al. ............... | 710/113 |
| 6,092,158 A | * | 7/2000 | Harriman et al. ........... | 710/240 |
| 6,145,052 A | * | 11/2000 | Howe et al. ................. | 710/43 |

* cited by examiner

*Primary Examiner*—Reginald G. Bragdon
(74) *Attorney, Agent, or Firm*—Lisa K. Jorgenson; Andre Szuwalski

(57) ABSTRACT

A method and system are disclosed for dynamically changing the priority of memory requests to access a memory device in a disk drive system. In particular, the disk drive system includes a hard disk controller having a processing element for performing various operations and a buffer for providing an interface to a memory device, such as a random access memory. The buffer includes arbitration block to prioritize memory requests to access the memory device. A priority modification block is included to modify the assigned priorities so that the priority assigned to a pending memory request submitted by the processing element is increased. The priority modification block triggers the modification of priorities upon the occurrence of an event, such as the reception of an interrupt by the processing element or a memory request submitted by the processing element timing out.

23 Claims, 6 Drawing Sheets

SYSTEM AND METHOD FOR DYNAMICALLY CONTROLLING MEMORY ACCESS PRIORITIZATION

BACKGROUND OF THE INVENTION

1. Technical Field of the Invention

The present invention relates to controlling memory access prioritization, and particularly to a system and method for dynamically varying memory access prioritization in a controller for a disk drive device.

2. Background of the Invention

Existing hard disk drive systems typically include a hard disk controller for, among other things, receiving and storing data retrieved from the storage disk prior to the retrieved data being transported to a host external to the disk drive system. Hard disk drive controllers conventionally include a read channel interface block for receiving data retrieved from the storage disk and placed on a read channel, and a buffer for temporarily storing the retrieved data and including a memory controller for controlling a separate memory device, such as a random access memory (RAM). The hard disk controller further includes a host interface for sending the retrieved data to the external host. A processing element in the hard disk controller performs functions that are not handled in hardware, such as processing servo information regarding the location of the head relative to the tracks on the storage disk, recovering from error conditions and configuring the disk drive system after power up.

The processing element typically utilizes off-chip memory, such as flash memory, that is dedicated to storing instructions and data for execution by the processing element. Because a dedicated flash memory is substantially slower than the RAM device associated with the buffer, existing or planned hard disk controllers have utilized the memory device associated with the buffer for storing some instructions and related data for execution by the processing element.

The RAM device associated with the buffer may store information corresponding to a number of different sources and/or function blocks within the conventional hard disk controller. Due to the fact that different sources/function blocks have different timing and bandwidth requirements in performing their intended functions, the buffer typically includes an arbitration block to prioritize memory access requests depending in part upon the particular sources/function blocks submitting the memory access requests. In this way, sources/function blocks within the hard disk controller access the RAM device based upon the individual timing and bandwidth requirements thereof.

In conventional hard disk controllers, the processing element is provided a relatively low priority to access the RAM device associated with the buffer. In most instances the processing element is capable of performing as planned while having assigned a lower priority relative to the other function blocks in the hard disk controller. The performance of the processing element and the hard disk controller in general is adversely affected, however, when the processing element processes certain interrupts. In particular, the processing element occasionally needs to relatively quickly handle certain interrupts, such as interrupts which indicate that the disk drive device has moved or that there is a problem with the spin speed of the disk drive device. If the processing element is waiting to complete a fetch from the RAM device when such an interrupt arrives, the processing element must wait until the fetch operation is complete before handling the interrupt. Because the processing element may oftentimes have to wait for an extended period of time before being granted access to the RAM device, the time delay before the processing element handles the interrupt may substantially hinder the performance of the disk drive system. Based upon the foregoing, there is a need for the processing element to effectively handle certain events without adversely effecting the performance of the other function and/or functional blocks in the hard disk controller.

SUMMARY OF THE INVENTION

The present invention overcomes the shortcomings in prior systems and thereby satisfies a significant need for a hard disk controller in which the processing element thereof relatively quickly performs certain operations, such as handling certain interrupts, without noticeably impacting the performance of other portions of the hard disk controller. In a preferred embodiment of the present invention, the hard disk controller dynamically modifies the priorities assigned to memory requests submitted by various function blocks in the hard disk controller in response to a particular function block, having submitted a memory request that was assigned a lower priority, requiring the memory request be completed sooner than the request would otherwise be completed.

Specifically, the hard disk controller includes a priority modification block which asserts a control signal upon the occurrence of an event. The event may be the reception, at the processing element, of one or more particular interrupts. The asserted control signal causes an arbitration block within the buffer to change the priorities of pending memory requests so that a memory request previously submitted by the processing element is assigned a higher priority relative to a priority level initially assigned to the memory request submitted by the processing element. The priority modification block de-asserts the control signal upon the memory request of the processing element being completed. Thereafter, memory requests subsequently submitted by the processing element are assigned the lower priority as before.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

Figure 1:
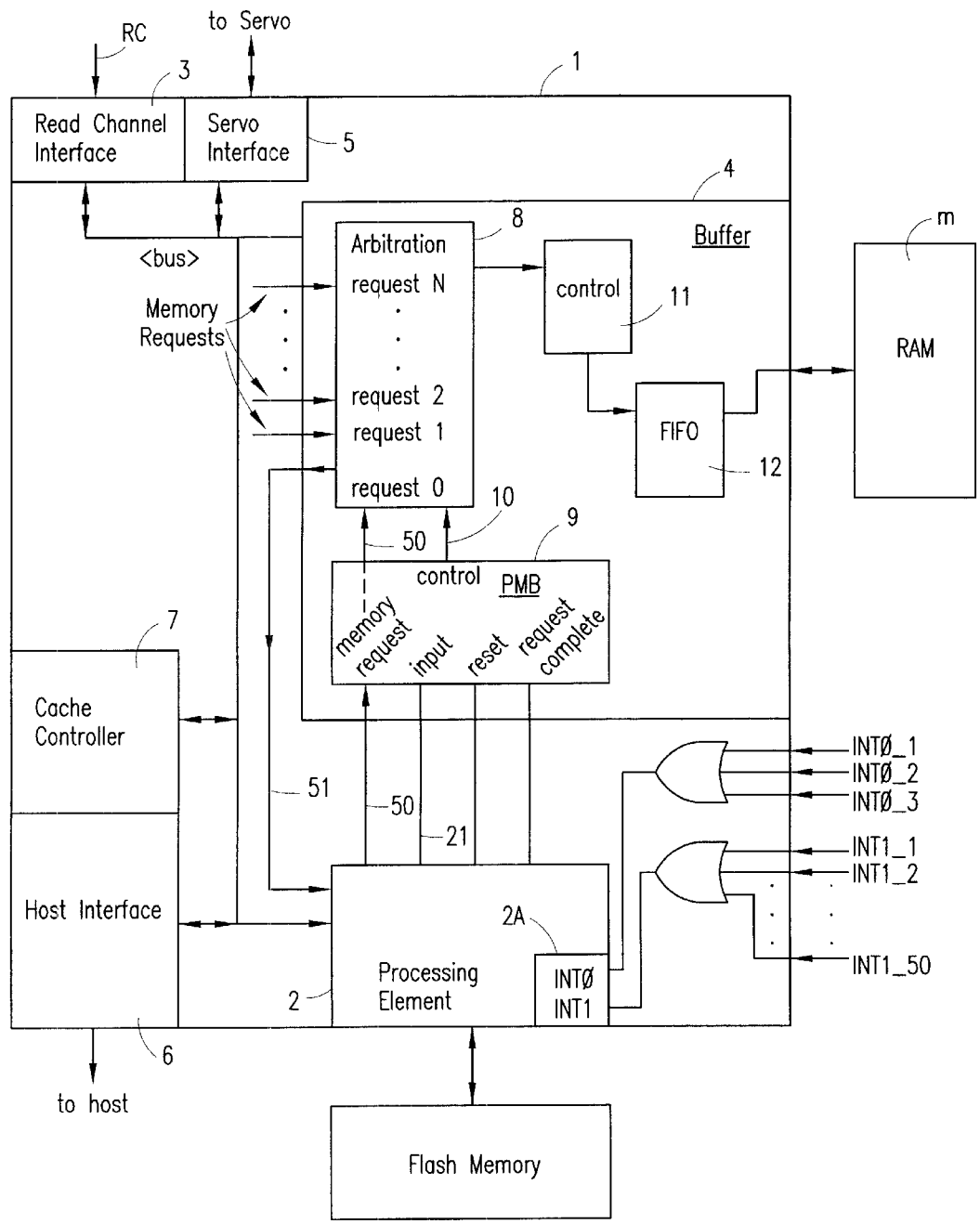
FIG. 1 is a block diagram of a hard disk controller according to a preferred embodiment of the present invention.

Referring to FIGS. 1–6, there is disclosed a hard disk controller 1 according to a preferred embodiment of the present invention. Hard disk controller 1 is preferably utilized within a disk drive system. Hard disk controller 1 may be fabricated on an integrated circuit chip or may form a portion of an integrated circuit chip.

Hard disk controller 1 includes a processing element 2 (FIG. 1) that generally performs functions that are not handled by other function blocks in hard disk controller 1, such as processing servo information regarding the location of the head relative to the tracks on the storage disk, recovering from error conditions and configuring the disk drive system after power up. Processing element 2 includes an interrupt interface 2A for receiving a plurality of interrupts. A read channel interface block 3 provides an interface for receiving data retrieved from the corresponding storage disk (not shown) over read channel RC. Read channel interface block 3 sends the retrieved data to buffer 4 for subsequent storage in a memory device M associated with hard disk controller 1. Buffer 4 temporarily stores data to be written to and previously read from memory device M. Buffer 4 may include one or more first-in-first-out (FIFO) memories for temporarily storing data to be written to memory device M and data read therefrom.

Hard disk controller 1 further includes other function blocks. For instance, hard disk controller 1 may include a servo interface block 5 which cooperates with processing element 2 to suitably control or assist in the control of a servo positioning device (not shown) of the disk drive system in which hard disk controller 1 is situated. Hard disk controller 1 further includes a host interface block 6 for communicating data with a host device (not shown) external to the disk drive system in which hard disk controller 1 is situated. In general terms, data is read from memory device M and is transported to the external host device via buffer 4 and host interface 6. Further, hard disk controller 1 may include a cache controller block 7.

As stated above, buffer 4 receives memory requests to access memory device M from the various function blocks on hard disk controller 1. In this way, buffer 4 serves as a memory controller for memory device M. Because the operations performed by the various function blocks may considerably vary in terms of timing and importance, buffer 4 preferably includes an arbitration block 8 which prioritizes the memory requests so that each function block of hard disk controller 1 functions as desired. A control block 11 within buffer 4 cooperates with arbitration block 8 and FIFOs 12 to serve as a memory controller for accessing memory device M.

In particular, arbitration block 8 preferably assigns one of a plurality of priority levels to each received memory request that cannot be immediately completed. The priority level assigned to a message request is based in part upon the particular function block that submitted the memory request. The particular priority levels assigned to pending memory requests may be in accordance with a predetermined priority order. The predetermined priority order utilized in assigning priority levels to pending memory requests may be, for example, hardwired and/or implemented in hardware. Alternatively, the predetermined priority order may be programmable.

It is noted that occasionally a function block, such as processing element 2, may require that a memory request submitted thereby to buffer 4 be completed faster than usual. For example, because processing element 2 must complete a memory request before handling an interrupt, processing element 2 may need buffer 4 to hasten the completion of a pending memory request submitted by processing element 2 in order for processing element 2 to suitably respond to an interrupt received thereby, such as an interrupt indicating a malfunction in the disk drive system requiring immediate attention. According to a preferred embodiment of the present invention, buffer 4 includes a priority modification block 9 which is adapted to assert a control signal 10 to trigger a reassignment of priority levels among the pending memory requests so that the pending memory request submitted by processing element 2 is completed sooner than the time the request would otherwise be completed. In this way, the time for completing the pending memory request by processing element 2 may be substantially shortened which thereby shortens the time for processing element 2 to suitably respond to an interrupt.

Figure 2:
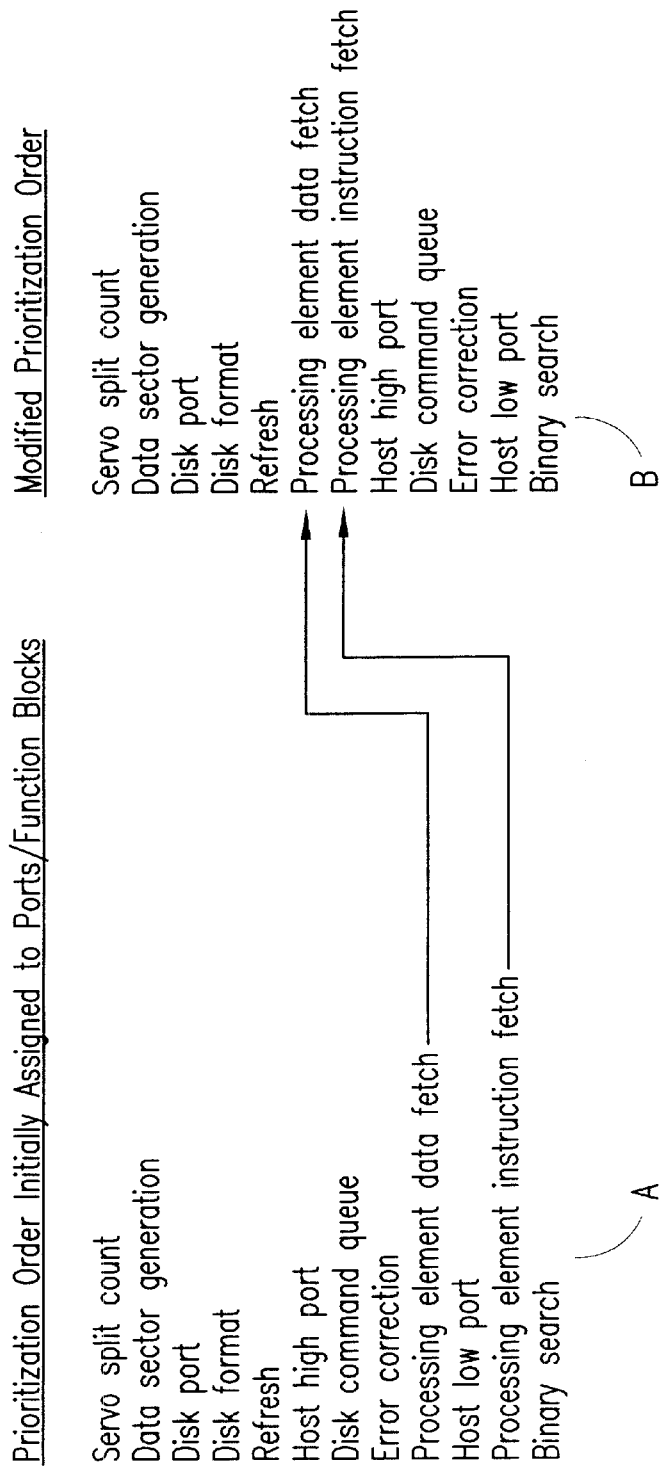
FIG. 2 is a table illustrating a priority reassignment scheme for assessing a memory device according to a preferred embodiment of the present invention.

FIG. 2 illustrates an exemplary priority reassignment scheme triggered by priority modification block 9. Each column in FIG. 2 is a list of ports and/or function blocks that request access to memory device M. For each column, the prioritization order appears in descending order such that the port and/or function block having the highest assigned priority is at the top of the column and the port/function block having the lowest assigned priority appears at the bottom of the column. Column A shows the predetermined prioritization order originally assigned to the ports/function blocks (prior to priority modification block 9 triggering a modification of the priority order). Column B shows the prioritization order assigned to the ports/function blocks following priority modification block 9 triggering a modification of the priority order. As can be seen, following priority modification block 9 triggering priority modification, the prioritization levels assigned to the ports corresponding to processing element 2 (for requesting an instruction fetch and a data fetch) are increased relative to the respective prioritization levels originally assigned thereto.

Priority modification block 9 preferably de-asserts control signal 10 following completion of the pending memory request so that memory requests subsequently submitted by processing element 2 are assigned the appropriate priority level in accordance with the above-described predetermined priority order originally utilized in assigning priority levels to memory requests from various function blocks in hard disk controller 1.

Priority modification block 9 receives an input signal 21 from processing element 2 that indicates the assertion of any one of a number of interrupt signals INTO. Input signal 21 is generated by performing a logical OR operation on three interrupt signals INTO for exemplary purposes only. It is understood that input signal 21 may be asserted upon the assertion of any number of interrupt signals INTO. In this example, interrupt signals INTO are active high signals so that the reception of an interrupt signal INTO (an asserted signal) is seen as input signal 21 thereafter being driven to the logic high state.

It is noted that other interrupt signals INT1 received by processing element 2 are not input signals to priority modification block 9 and therefore do not trigger a modification of priorities assigned to pending memory requests submitted to buffer 4.

Figure 3:
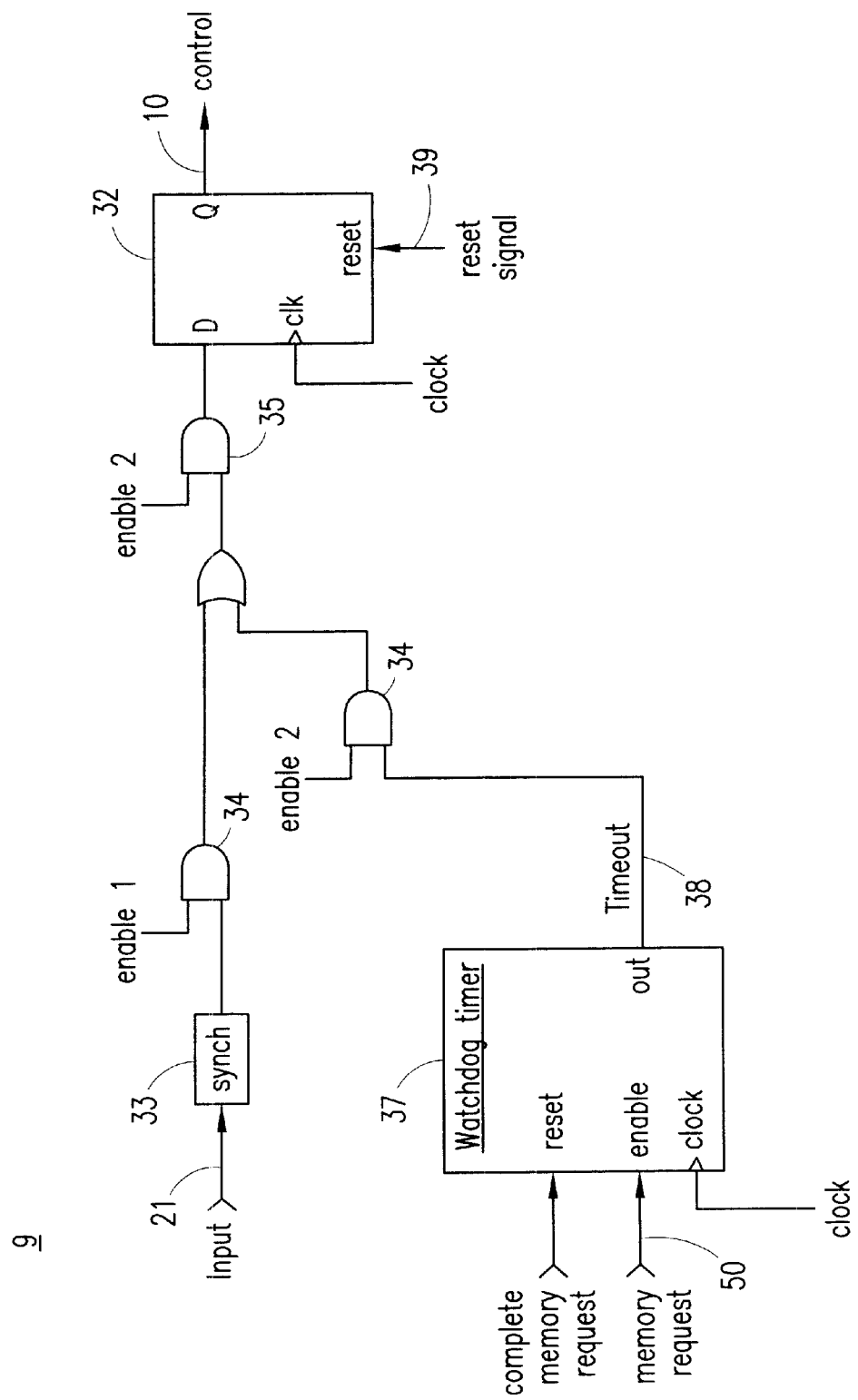
FIG. 3 is a logic diagram of a control block of the hard disk controller shown in FIG. 1 according to a first preferred embodiment of the present invention.

Referring to FIG. 3, there is disclosed priority modification block 9 according to a preferred embodiment of the present invention. Priority modification block 9 is shown as asserting control signal 10 following assertion of input signal 21. Priority modification block 9 preferably maintains control signal 10 in an asserted state for a period of time following the assertion of input signal 21.

Input signal 21 is synchronized by synchronizer circuit 33 to the clock signal utilized by processing element 2. The synchronized signal passes through first enabling logic 34. First enabling logic 34 allows for selective enablement of interrupt signals INTO to modify the priority assigned to a pending memory request previously submitted by processing element 2. A logical OR gate may be utilized to receive the output of first enabling logic 34 and other signals for triggering a modification of assigned priorities. A second enabling logic 35 may receive the output of the OR gate and another enabling signal so that both input signal 21 and all of the signals intended to trigger a change in priorities may be selectively enabled. A storage circuit 32, such as a flip flop, temporarily stores the output of second enabling logic 35.

The output control signal 10 of storage circuit 32 is an input to arbitration block 8 so that the assertion of control signal 10, triggered by an asserted interrupt signal INTO, triggers the modification of the priority level assigned to a pending memory request previously submitted by processing element 2.

Figure 4:
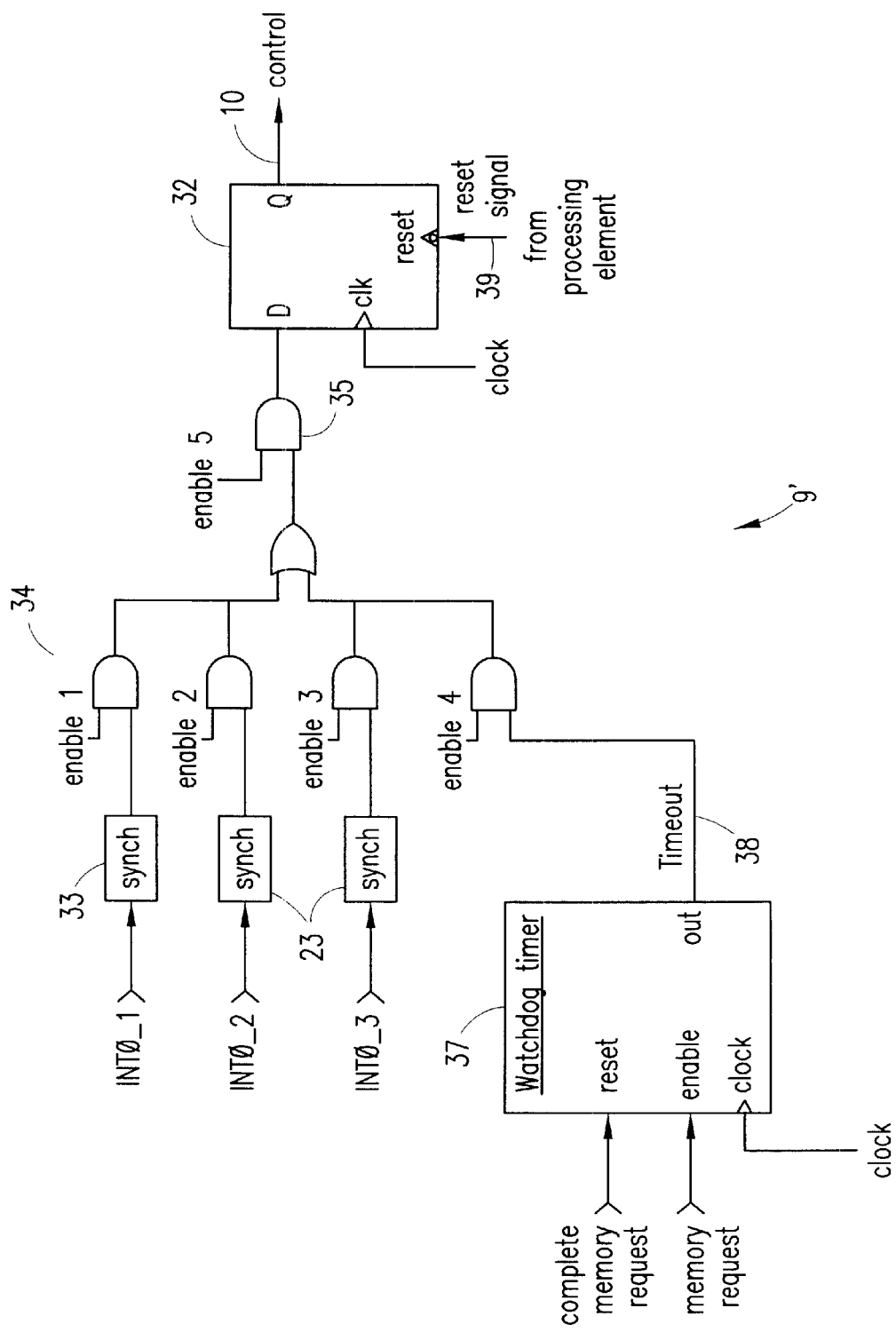
FIG. 4 is a logic diagram of a control block of the hard disk controller shown in FIG. 1 according to a second preferred embodiment of the present invention.

Instead of generating input signal 21, it is understood that each interrupt signal INTO may be a direct input to priority modification block 9. FIG. 4 illustrates an alternative preferred embodiment of priority modification block 9' in which each interrupt signal INTO drives a distinct synchronizer circuit 33. First enabling logic 34 includes a plurality of logical AND gates, with each AND gate being driven by a distinct enable signal and a distinct synchronized interrupt signal INTO. The logical OR gate combines the output of the first enabling logic 34 and any other signal intended to trigger a change in prioritization. Storage device 32 receives as an input the output of second enabling logic 35. As can be seen, priority modification block 9' may selectively enable each interrupt signal INTO (using the enable signals which drive first enabling logic 34) as well as selectively enable the entire group of interrupt signals INTO and other triggering signals (using the enable signal which drives second enabling logic 35).

It is further understood that each interrupt signal INTO may be conditioned prior to driving the corresponding synchronizer circuit 33. In particular, since priority modification need only happen upon the assertion of any interrupt signal INTO while a memory request submitted by processing element 2 is pending, interrupt signals INTO may pass through additional enabling logic (not shown) that inhibits the asserted interrupt signal INTO from asserting control signal 10 when a memory request by processing element 2 is not pending.

As shown in FIG. 1, control signal 10 is an input to arbitration circuitry 8. Upon reception of an asserted control signal 10, arbitration block 8 modifies the priorities assigned to the pending memory requests so that the memory request submitted by processing element 2 is assigned a higher priority level. Arbitration block 8 may, for example, utilize multiplexing circuitry in modifying the priority assignments. Alternatively, arbitration block 8 utilizes other circuitry to perform the prioritization modification.

As indicated above, the priorities assigned to pending memory requests to access memory device M may be modified upon the occurrence of an event other than the reception of an interrupt signal INTO by processing element 2. The priority order for memory requests may be modified if a memory request remains pending for a predetermined period of time. In particular, priority modification block 9 may include a watchdog timer 37 (FIGS. 3 and 4) which detects when a memory request submitted by processing element 2 remains pending for the predetermined period of time. A value representing the predetermined period of time may be loaded into watchdog timer 37 upon the successful completion of a previously submitted memory request. Watchdog timer 37 is enabled by processing element 2 so as to begin counting (decrementing) when a memory request is submitted to buffer 4 by processing element 2. In the event the submitted memory request is completed prior to the value in watchdog timer 37 reaching zero, watchdog timer is initialized to store the value corresponding to the predetermined period of time and no further activity takes place with respect to watchdog timer 37 until a subsequent memory request signal 50 is made by processing element 2. On the other hand, in the event the value in watchdog timer 37 reaches zero, a timeout signal 38 is asserted by watchdog timer 37. Similar to synchronized input signal 21 (FIG. 3) and synchronized interrupt signals INTO (FIG. 4), timeout signal 38 is an input to first enabling logic 34 so that control signal 10 is asserted following the assertion of timeout signal 38. In this way, a temporal based event may trigger the modification of priorities assigned to pending memory requests.

Figure 5:
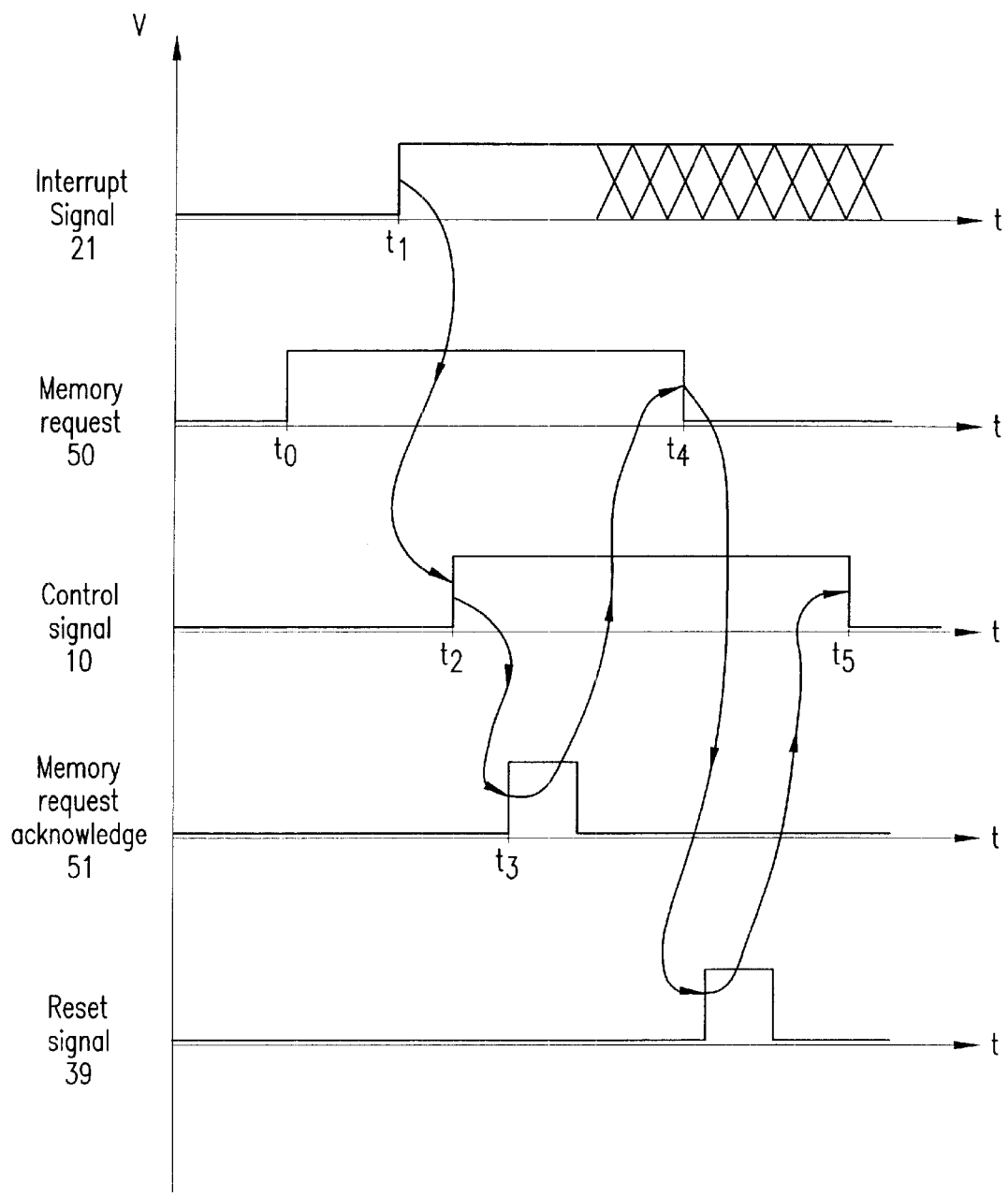
FIG. 5 is a timing diagram illustrating an operation the hard disk controller shown in FIG. 1.
Figure 6:
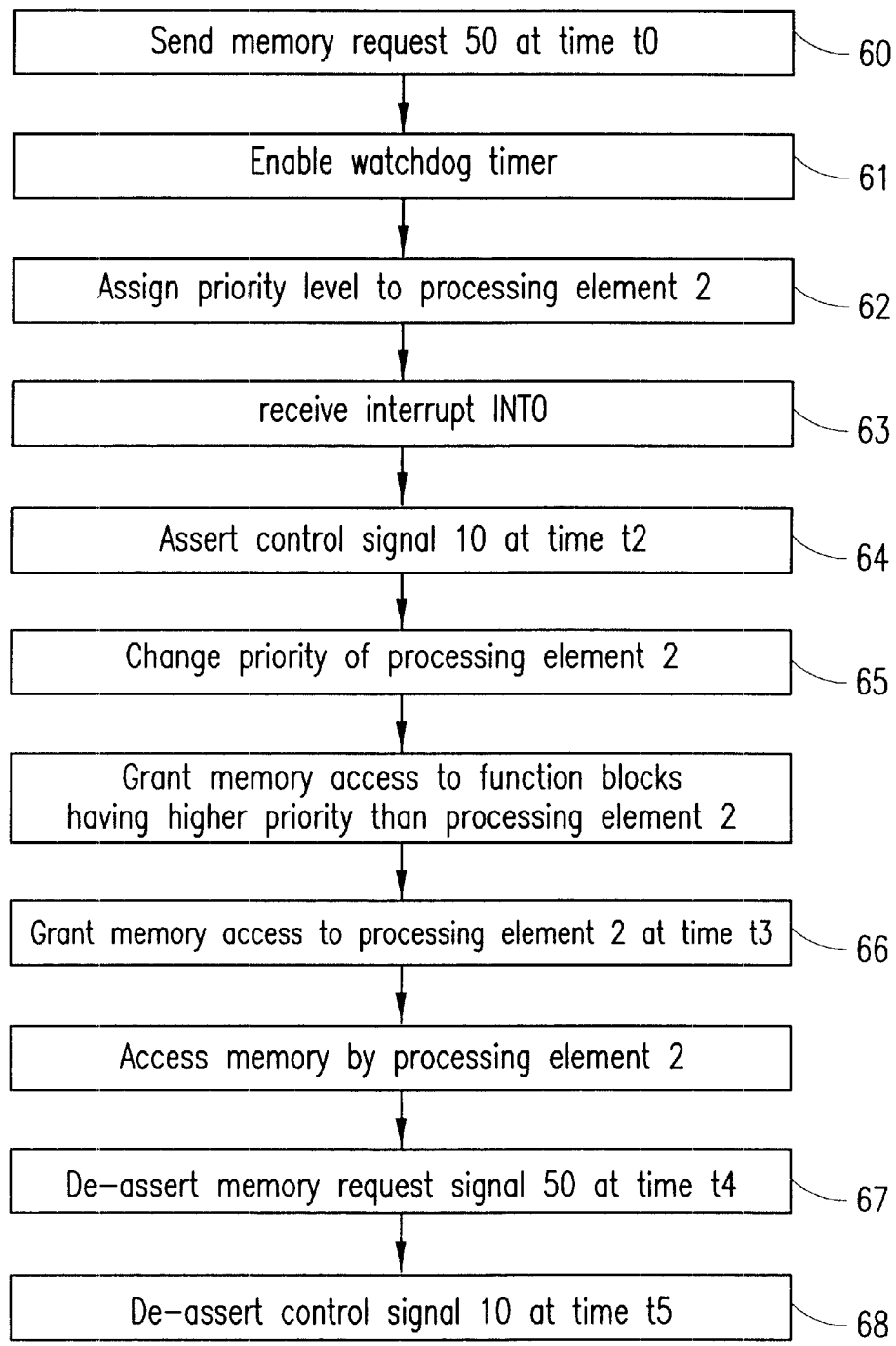
FIG. 6 is a flow chart illustrating the operation of the hard disk controller illustrated by FIG. 1.

The operation of the present invention will be described with reference to the timing diagram of FIG. 5 and the flow chart of FIG. 6. A memory request signal 50, submitted by processing element 2, is asserted at time t0 (step 60). The memory request may be a request to fetch an instruction or data. Watchdog timer 37 is enabled at this point (step 61). Upon reception of asserted memory request 50, arbitration block 8 assigns a priority level to asserted memory request 50 (step 62) if buffer 4 cannot immediately grant memory access to processing element 2. In this case, the priority level assigned to memory request signal 50 is low relative to other memory requests received by buffer 4 (not shown). As a result, memory request signal 50 remains pending (in an asserted state) for a period of time following time t0.

At time t1, an interrupt signal INTO to processing element 2 is asserted (step 63). The asserted interrupt signal INTO is synchronized and, assuming first enabling logic 34 and second enabling logic 35 suitably enable the asserted interrupt signal INTO, asserts control signal 10 at time t2 (step 64). At this point, arbitration block 8, having received the asserted control signal 10, changes and/or increases the priority level assigned to memory request 50 (step 65).

When buffer 4 has completed all of the pending memory requests having higher assigned priority levels, buffer 4 grants processing element 2 access to memory device M (step 66). Specifically, buffer 4 asserts a previously de-asserted memory request acknowledge signal 51 at time t3 corresponding to the memory request signal 50 submitted by processing element 2.

Following processing element 2 accessing memory device M, processing element 2 de-asserts memory request signal 50 at time t4 (step 67), which causes reset signal 39 of storage circuit 32 to assert so as to de-assert control signal 10 at time t5 (step 68). Control signal 10 being in a de-asserted state causes arbitration block 8 to thereafter assign prioritization levels to received memory requests according to the predetermined priority order.

The operation of hard disk controller 1 in response to the predetermined period of time having elapsed following the submission of memory request signal 50, is much the same as the above-described operation. In this case, however, control signal 10 is asserted due to the assertion of timeout signal 38 (caused by watchdog timer 37 detecting the predetermined period of time) instead of the assertion of an interrupt signal INTO.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A controller for a disk drive device, comprising:
    a processing element for performing operations within the controller, the processing element being capable of executing a plurality of executable instructions, information associated with the execution of at least one executable instruction being stored in a memory device;
    a read channel interface block for receiving data from a storage disk associated with the controller;
    a buffer in communication with the memory device, for temporarily storing the received data prior to being written to the memory device, comprising:
        an arbitration block for arbitrating between a plurality of memory requests to access the memory device submitted by a plurality of sources based upon a predetermined prioritization order; and
        a prioritization control block for selectively causing the arbitration block to modify a priority level assigned by the arbitration block to a first memory request submitted by the processing element and pending memory access grant, relative to a level of prioritization assigned to memory requests from the processing element according to the predetermined prioritization order, the prioritization control block receiving a plurality of interrupt lines, the prioritization control block selectively and individually enabling each of the plurality of interrupt lines, the prioritization control block causing the arbitration block to perform the priority level modifying upon receipt of any interrupt signal on an enabled interrupt line; and
    a host interface block for retrieving the received data from the memory device and sending the received data to an external host.

2. The controller of claim 1, wherein:
    the prioritization control block selectively increases the priority level assigned to the first memory request submitted by the processing element that was previously sent to the buffer and not completed at the time the interrupt signal appearing on one of the plurality of interrupt lines is received by the interrupt interface.

3. The controller of claim 1, further comprising:
    a timer block, in communication with the processing element, for detecting a period of time that the first memory request remains unfinished relative to the submission thereof by the processing element, the prioritization control block temporarily modifying the priority level assigned to the first memory request following detection of the period of time by the timer block.

4. The controller of claim 3, wherein the timer block comprises:
    a watchdog timer that is initialized to a predetermined value prior to initiation of the first memory request and begins counting thereat.

5. The controller of claim 1, wherein:
    subsequent memory requests submitted by the processing element are assigned a priority level according to the predetermined prioritization order.

6. The controller of claim 1, wherein the prioritization control block comprises:
    logic for asserting a control signal upon reception of an interrupt signal; and
    a storage element for temporarily storing the asserted control signal, an assertion of an output of the storage element triggering the arbitration block to modify the priority level assigned to the first memory request.

7. The controller of claim 6, wherein:
    the logic for asserting a control signal asserts the control signal upon reception of any of a plurality of first interrupt signals appearing on enabled interrupt lines.

8. The controller of claim 1, further comprising:
    a timeout block, in communication with the processing element, for detecting a period of time that the first memory request remains unfinished relative to initiation thereof; and
    wherein the prioritization control block further comprises circuitry for asserting a control signal upon reception of the detection of the period of time, the control signal triggering the arbitration block to modify the priority level assigned to the first memory request.

9. The controller of claim 1, wherein the prioritization control block generates a plurality of enable lines, each enable line enabling an interrupt signal appearing on a distinct interrupt line.

10. In a disk drive controller including a processing element and a buffer for interfacing a memory device associated with the disk drive controller, a method of prioritizing a plurality of memory requests for accessing the memory device received by the buffer and submitted by a plurality of circuit blocks, comprising the steps of:
    for each received memory request that cannot be completed immediately upon receipt thereof, assigning any of a plurality of levels of priority to the received memory request based upon the circuit block submitting the memory request and according to a predetermined prioritization order;
    receiving an interrupt of a first type by the processing element on any of a plurality of interrupt signal lines;
    individually and selectively enabling the interrupt signal lines; and
    changing a priority level assigned to a first memory request, previously submitted by the processing element and pending memory access grant, to a different priority level, in response to the reception of an interrupt signal on any enabled interrupt signal line.

11. The method of claim 10, wherein the step of changing the priority level comprises the step of:
    increasing the priority level assigned to the memory request submitted by the processing element to a higher priority level relative to the priority level assigned thereto according to the predetermined prioritization order.

12. The method of claim 10, further comprising the step of:
    assigning a priority level to memory requests subsequently submitted by the processing element according to the predetermined prioritization order.

13. The method of claim 10, further comprising the step of:
    detecting the memory request submitted by the processing element exceeding a predetermined period of time before completing; and
    wherein the step of changing the priority level assigned to the memory request submitted by the processing element comprises changing the priority level in response to the predetermined period of time being detected.

14. The method of claim 10, wherein:

the memory request submitted by the processing element comprises a memory request to fetch an instruction from the memory device.

15. The method of claim 10, wherein:

the memory request submitted by the processing element comprises a memory request to fetch data from the memory device.

16. A controller chip, comprising:

at least one interface block for communicating information with an off-chip source of information;

a processing element for sequentially executing a plurality of instructions, information relating to at least one instruction being stored in a memory device; and a buffer in communication with the memory device, for temporarily storing information read from and to be written to the memory device, comprising:

an arbitration block for prioritizing for sequential execution a plurality of memory requests to access the memory device; and a prioritization modification block for selectively and individually enabling each of a plurality of interrupt signal lines and changing the order for accessing the memory device by pending memory requests in response to an interrupt signal appearing on any interrupt signal line enabled by the prioritization modification block.

17. The controller chip of claim 16, wherein:

a pending memory request submitted by the processing element is assigned a higher priority to access the memory device relative to the priority initially assigned to the memory request submitted by the processing element.

18. The controller chip of claim 16, wherein:

the prioritization modification block detects the expiration of a predetermined period of time following a memory request being initially submitted by the processing element, the prioritization modification block being responsive to the detection of the predetermined period of time.

19. The controller chip of claim 18, wherein:

the prioritization modification block includes a timer element that is initialized and activated to count upon the memory request being initially submitted by the processing element.

20. The controller chip of claim 16, wherein:

a memory request submitted by the processing element comprises a request to fetch the at least one instruction from the memory device.

21. The controller chip of claim 16, wherein:

a memory request submitted by the processing element comprises a request to fetch data from the memory device.

22. The controller chip of claim 16, wherein:

the controller chip comprises a controller for a disk drive device.

23. The controller chip of claim 16, wherein the prioritization modification block includes a plurality of enable lines, each enable line enabling an interrupt signal appearing on a distinct interrupt signal line.

* * * * *